United States Patent [19]

Schaap

[11] Patent Number: 4,930,337
[45] Date of Patent: Jun. 5, 1990

[54] AUTOBODY DOOR ALIGNING TOOL
[75] Inventor: Herm Schaap, Sparta, Canada
[73] Assignee: Levrite Inc., Ontario, Canada
[21] Appl. No.: 350,977
[22] Filed: May 12, 1989
[51] Int. Cl.$^5$ .............................................. B21D 1/12
[52] U.S. Cl. ....................................... 72/458; 81/484; 72/479; 72/705
[58] Field of Search ...................... 81/484; 29/267, 271, 29/11; 72/458, 479, 705; 52/291

[56] References Cited

U.S. PATENT DOCUMENTS

| 4,399,683 | 8/1983 | Hunter | 72/458 |
| 4,619,132 | 10/1986 | McBee | 72/458 |
| 4,744,135 | 5/1988 | Roels | 29/271 |

Primary Examiner—Roscoe V. Parker
Attorney, Agent, or Firm—Patrick J. Hofbauer

[57] ABSTRACT

An autobody door latch alignment tool comprising a lever arrangement including:
  a strike pin engaging slot adapted to engage, and be rotatable about a strike pin mounted on a first door post of an autobody opposite a second door post arranged apart from and generally parallel to the first door post;
  a door latch engaging pin adapted to engage a door latch on a misaligned door that is hung by hinges from the second door post of the autobody, with the door latch engaging pin being arranged in mutually spaced apart relation from the strike pin engaging slot at respective points defining a chord along an arc subtended by an angle of the doors rotation about its hinges; and,
  a lever arm;
with the door latch engaging pin and strike pin engaging slot being interconnected through a connection extending transversely to the chord, and being adapted to be secured in fixed relation with the lever arm, in which arrangement the strike pin engaging slot is operable to act as a fulcrum when securely engaged in rotatable relation with the strike pin, in response to an application of leverage through the lever arm from a point remote from both the strike pin engaging slot and the door latch engaging pin, and the door latch engaging pin is operable in conjunction therewith and when engaged with the door latch, to exert a corrective bending moment through the door to the hinges thereof.

12 Claims, 3 Drawing Sheets

AUTOBODY DOOR ALIGNING TOOL

FIELD OF THE INVENTION

The present invention relates to autobody tools and in particular to a door latch alignment tool.

BACKGROUND OF THE INVENTION

Door latch misalignment occurs usually in older or damaged vehicles, and less often in new vehicles where the door simply has not been assembled in proper alignment with the autobody.

The problem can also arise in the course of correcting misalignment of the so-called "character lines" (surface contours or other body panel shapes, or other exterior details such as paint work, decals or other decorative or functional trim). The first step in realigning the character lines is to loosen the striker from the door post and reposition it either up or down by an amount equal to the amount of misalignment that is observed between corresponding features on the door and the balance of the body. The striker is then secured in its new position, and if the repositioning is in any way substantial then the latch and striker plate will be vertically misaligned as a consequence of adjusting the striker.

In either case the problem manifests as difficulty in operating the door. For the purposes of this patent specification, misalignment shall refer to vertical misalignment between the latch and striker of the automobile door assembly.

In prior attempts at correcting the door latch misalignment problems, recourse was typically taken to the use of a lever, such as a length of the so called "2×4" wall studding. With the door of the car at least partially opened, one end of this lever was then placed on the sill of the door opening, with an intermediate portion of the stud being positioned beneath the open door in contacting relation therewith, and the other, free end extending beyond the exterior of the door. The free end was then lifted to force the door back into the desired alignment. A number of difficulties are associated with this practice.

When the lever is lifted against the bottom of the door, the tendency is for the door to move along the stud, with the result that the force applied to the door tends to curl the bottom of the door panel rather than lifting the door upwardly against its hinges. In addition, the lifting force is applied to the lower surfaces of the door, and the load bearing capacity of this portion of the door may not be sufficient to allow the door latch to be realigned without crushing the bottom of the door. This problem is exacerbated in older cars where rust has further weakened the bottom of the door.

Also, the height of the free end of the stud in such an application is only slightly above floor level unless the car is first placed up on jacks. In addition to being inconvenient and time consuming, the use of jacks can be dangerous, since considerable leverage force is sometimes required to correct the misalignment. Without the jacks on the other hand, there is the very real risk of back injury to an operator who must bend down to exert leverage from a point so close to floor level.

Accordingly there exists a need for a tool more suitable for correcting common misalignment problems in door latches.

SUMMARY OF THE INVENTION

In accordance with the present invention there is provided an autobody door latch alignment tool including:

door latch engaging means adapted to engage a door latch on a misaligned door that is hung by hinges from the second door post of the autobody, with the door latch engaging means being arranged in mutually spaced apart relation from the strike pin engaging means each at respective points defining a chord along an arc subtended by an angle of the doors rotation about the hinges; and, lever arm means; said door latch engaging means and strike pin engaging means being interconnected through means extending transversely to said chord, and being adapted to be secured in fixed relation with said lever arm means, in which arrangement the strike pin engaging means is operable to act as a fulcrum when securely engaged in rotatable relation with the strike pin, in response to an application of leverage through the lever arm means from a point remote from both the strike pin engaging means and the door latch engaging means, and the door latch engaging means is operable in conjunction therewith and when engaged with the door latch, to exert a corrective bending moment through the door to the hinges thereof.

Preferably a first portion of the means interconnecting the door latch engaging means and the strike pin engaging means extends in a first direction from the strike pin engaging means along the side of the chord opposite the arc, to a second portion extending in a second direction transversely of the chord to a third portion extending in a third direction, on the side of the chord adjacent the arc, to the door latch engaging means."

In one embodiment the tool of the present invention includes a strike pin engaging means which comprises an elongated rectangular bar having an open ended slot arranged in one end thereof. The slot is adapted to receive and engage a portion of the strike pin, which is typically an elongated cylinder, in interfitting relation therewith.

Various slot shapes can be used. For example the slot may be defined between a pair of mutually opposed, parallel sides, or may instead comprise a plurality of nested slots arranged with the widest slot nearest the slotted end of the bar, with successively narrower nested slots arranged in order of decreasing slot width. In accordance with another embodiment of the invention the slot has a generally triangular shape with its base opening out from the end of the bar, and having sides converging inwardly towards an apex at a point on the bar, spaced apart from opening in the end thereof.

In some applications, the strike pin comprises an elongated cylindrical portion having a first diameter adjacent where it is fixed at one end to an autobody, and a larger diameter portion arranged at the opposite end thereof. The larger diameter portion may, for example, comprise a disk shaped stop arranged in coaxial relation with the elongated cylindrical portion at the end thereof opposite the end that is fixed to the autobody. In such an arrangement the tool according to one embodiment of the present invention is preferably adapted to engage the elongated cylindrical portion of the strike pin between the two portions of the bar that define the mutually opposed sides of the slot, where the distance between the two portions of the bar is larger than the diameter of the strike pin, but smaller than the diameter of the disc shaped stop.

In a preferred embodiment of the tool of the present invention the end of the bar bearing the slot is laterally offset from the door latch engaging means through a compound angle bend in the bar intermediate between the slot and the door latch engaging means. Through the improved clearance from adjacent body parts associated with this arrangement it is possible to locate the tool in use, such that the door need be only slightly ajar, and the corrective bending moment can be applied primarily upwardly to the door, and the mechanical advantage of the available leverage can be maximized.

The elongated rectangular bar is preferably also adapted to receive a threaded portion of the door latch engaging means in secured threaded relation with a complimentary tapped bore located in the bar in spaced apart relation from the slot.

The door latch engaging means is preferably adapted to extend outwardly from the bar, and have the same, (typically generally cylindrical), shape as the strike pin. In this embodiment the door latch engaging means is operable to engage with the door latch in substantially the same way as the strike pin. The tool according to one aspect of the present invention will include a plurality of demountable door latch engaging pins of various sizes, each adapted be secured, one at a time, to the bar and to be used in conjunction with respective ones of a corresponding plurality of variously sized door latches found on different makes and models of automobiles.

DETAILED DESCRIPTION OF A PREFERRED EMBODIMENT

Introduction to the Drawings

In the following detailed description of an embodiment of the present invention reference will be made to the appended drawings in which.

Figure 1:
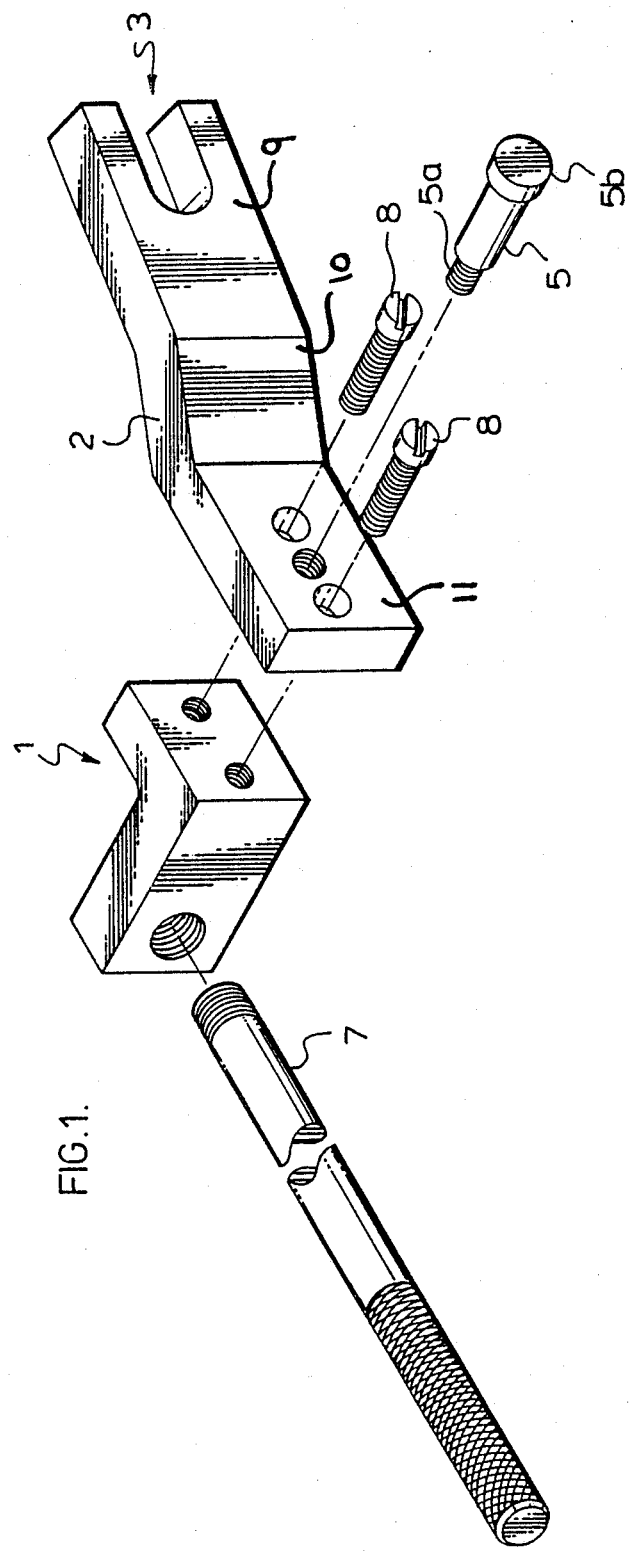
FIG. 1 is an exploded perspective view of a lever arrangement of the present invention.
Figure 2:
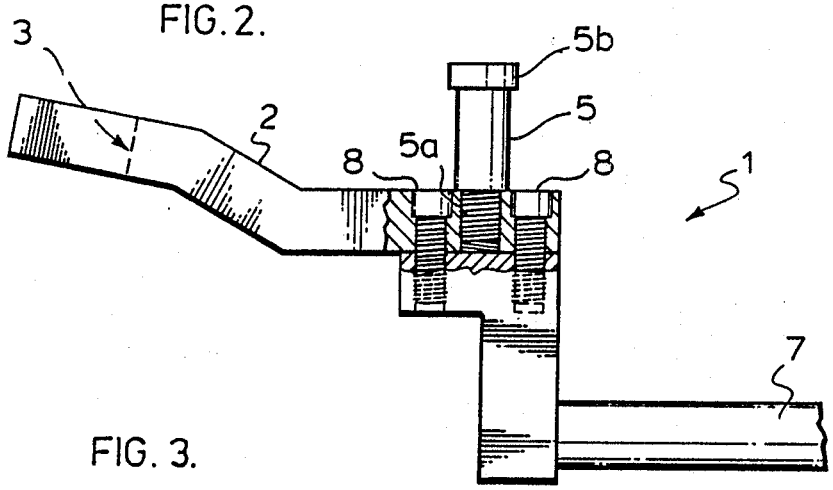
FIG. 2 is an elevated side view of a portion of one embodiment of the present invention with fastening means for securing the various parts of the embodiment, shown in phantom.
Figure 3:
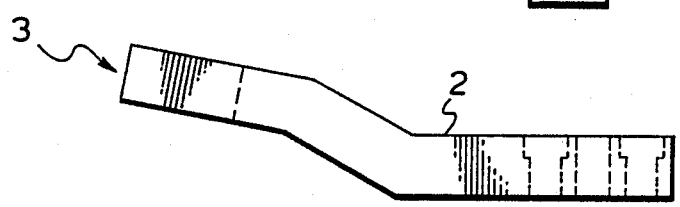
Figure 4:
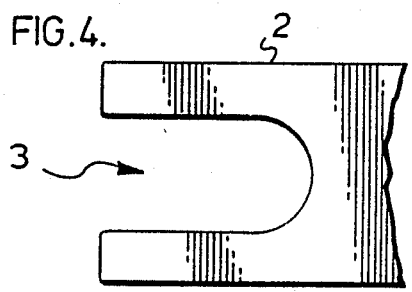
Figure 5:
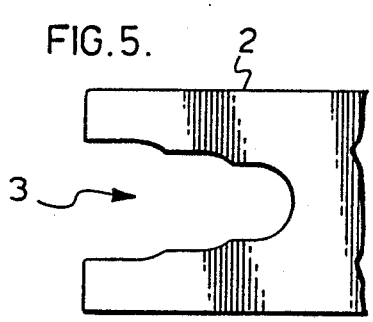
Figure 6:
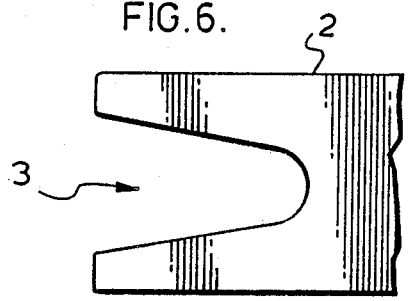
Figure 7:
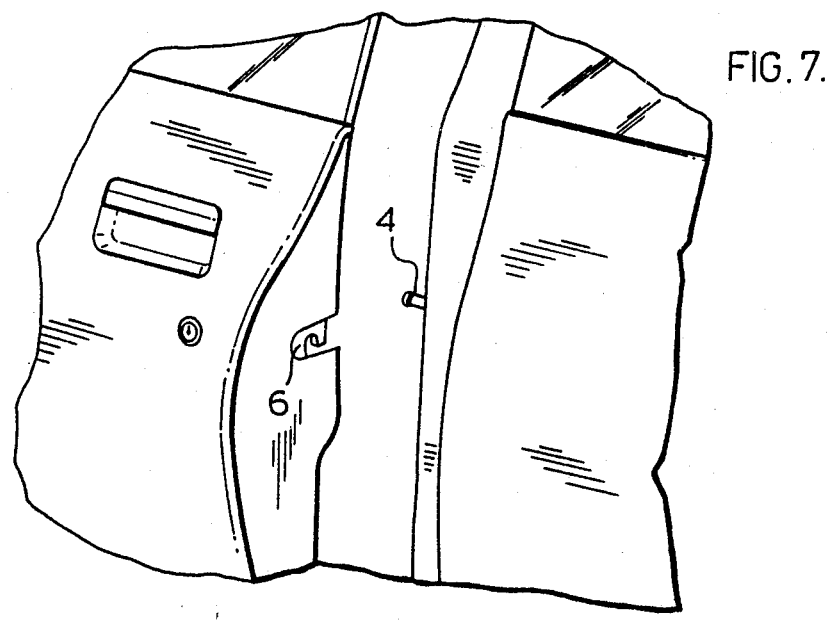
Figure 8:
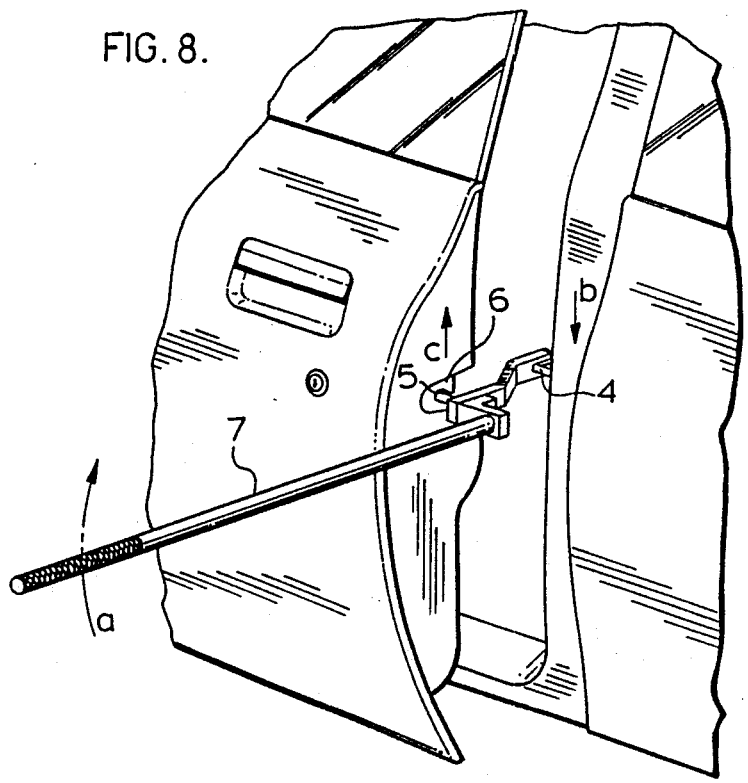

FIG. 3 of the drawings is an elevated side view of a portion of the embodiment depicted in FIGS. 1 and 2, showing an offset angle arrangement between a portion adapted to secure the strike pin and a portion adapted to secure the door latch;

FIG. 4 is a plan view of a portion of one embodiment of the invention, which portion is adapted to secure one size of strike pin; while, FIG. 5 is a comparable view of an embodiment in which that same portion is adapted to secure three different sizes of striker pin;

FIG. 6 of the drawings shows an alternative embodiment of the slot shapes that can be used in the present invention;

FIG. 7 of the drawings shows an automobile latch and corresponding striker in situ; and, FIG. 8 illustrates the use of the embodiment described in relation to FIG. 1, in use.

Referring now to the drawings in general there is shown an autobody door latch alignment tool comprising a lever arrangement 1, including strike pin engaging means comprising an elongated rectangular bar, 2, having an open ended slot, 3, at one end thereof adapted to engage a strike pin 4, mounted on a door post of an autobody. The bar 2, is rotatable about the strike pin 4, when so engaged. Lever arrangement 1 further includes a door latch engaging pin 5, secured, in mutually spaced apart relation from the slot 3, adjacent the opposite end of the rectangular bar 2. The door latch engaging pin 5 is adapted to engage the door latch 6, associated with the strike pin 4, of a misaligned door that is hung from the above mentioned autobody. The lever arrangement 1 also includes a lever arm, 7, which together with bar 2 and door latch engaging pin 5 are adapted to be secured in fixed relation with one another by fastening means 8 and a threaded base portion 5a, of door latch pin 5 in cooperation with a correspondingly threaded portion of bar 2. In this arrangement the strike pin engaging slot 3, is operable to act as a fulcrum when engaged in rotatable relation about the strike pin 4, in response to an application of leverage through the lever arm 7, from a point remote from both the strike pin engaging slot 3, and the door latch engaging pin 5; and the door latch engaging pin 5, is operable in conjunction therewith and when engaged with the door latch 6, to exert a corrective bending moment on the hinges, (not shown) of a misaligned door. Note that the door latch engaging pin 5 is arranged in mutually spaced apart relation from the strike pin engaging slot 3 with each being located at respective points defining a chord along an arc subtended by an angle of the doors rotation about its hinges. A first portion 9 of bar 2 interconnecting the door latch engaging pin 5 and the strike pin engaging slot 3 extends in a first direction from the strike pin engaging slot 3 along the side of the chord opposite the arc, to a second portion 10 extending in a second direction transversely of the chord to a third portion 11 extending in a third direction, on the side of the chord adjacent the arc, to the door latch engaging pin 5.

In operation the lever arrangement 1, of the autobody door latch alignment tool is positioned with the slotted end of the rectangular bar 2, between a slightly ajar automobile door and door post. Slot 3 is engaged with strike pin 4, and door latch engaging pin 5 is positioned in register with door latch 6. The door is closed until the door latch 6 engages door latch engaging pin 5 is secured relation. Leverage force is then applied through lever arm 7, in the direction shown in FIG. 8 by the arrow "a". The applied force is communicated, see arrow "b", to where strike pin 4 is engaged with slot 3, which acts as a fulcrum about which the lever arrangement 1 is rotatable. Upon rotation of lever arrangement 1 about the fulcrum in response to further leverage force applied through lever arm 7, a lifting moment represented by arrow "c" is transmitted to the automobile door which in turn becomes a bending moment that is active across the automobile's door hinges. The door can be selectively repositioned through this application of force, using the tool of the present invention.

I claim:
1. An autobody door latch alignment tool including:
   a strike pin engaging means adapted to engage, and be rotatable about at strike pin mounted on a first door post of an autobody opposite a second door post arranged apart from and generally parallel to the first door post;
   a door latch engaging means adapted to engage a door latch on a misaligned door that it is hung by hinges from the second door post of said autobody, said door latch engaging means being arranged in mutually spaced apart relation from the strike pin engaging means at respective points defining a chord along an arc subtended by an angle of said doors rotation about said hinges; and, lever arm means;

said door latch engaging means and strike pin engaging means being interconnected through interconnecting means wherein a first portion thereof extends in a first direction from said strike pin engaging means along one side of said chord opposite of said arc to a second portion extending in a second direction transversely of said chord, to a third portion extending in a third direction, on a side of said chord adjacent said arc and towards said door latch engaging means, said interconnecting means adapted to be secured in fixed relation with said lever arm means, in which arrangement the strike pin engaging means is operable to act as a fulcrum when securely engaged in rotatable relation with the strike pin, in response to an application of leverage through lever arm means from a point remote from both the strike pin engaging means and the door latch engaging means and the door latch engaging means is operable in conjunction therewith and when engaged with the door latch, to exert a corrective bending moment through the door to the hinges thereof.

2. The tool according to claim 1 wherein the strike pin engaging means comprises an elongated rectangular bar having an open ended slot arranged in one end thereof, said slot being adapted to receive and engage a portion of the strike pin in interfitting relation therewith.

3. The tool according to claim 2 wherein the strike pin comprises an elongated cylinder.

4. The tool according to claim 2 wherein the elongated rectangular bar is adapted to receive a threaded portion of the door latch engaging means in secured threaded relation with a complimentary tapped bore in said bar located in spaced apart relation from said slot.

5. The tool according to claim 2 wherein the door latch engaging means is substantially identical to said strike pin.

6. The tool according to claim 3 wherein a portion of the door latch engaging means adapted to extend outwardly from said bar, has the same generally cylindrical shape as the strike pin, and is functionally fungible therewith.

7. The tool according to claim 2 wherein the slot comprises a plurality of nested slots arranged with the widest slot nearest the slotted end of the bar, with succeedingly narrower slots extending inwardly therefrom towards an opposite end of said bar and arranged in order of decreasing slot size.

8. The tool according to claim 3 wherein the slot has a generally triangular shape with its base opening out from the end of the bar, and having sides converging inwardly towards an apex at a point on the bar, spaced apart from said end.

9. The tool according to claim 6 wherein the door latch engaging means includes a plurality of demountable door latch engaging pins of various sizes adapted be secured one at a time to the bar and to be used in conjunction with respective ones of a corresponding plurality of variously sized door latches.

10. The tool according to claim 3 wherein the strike pin comprises an elongated cylindrical portion having a first diameter and being fixed at one end to an autobody, and a larger diameter portion arranged at an end thereof opposite said one end.

11. The tool according to claim 10 wherein said larger diameter portion comprises a disk shaped stop arranged in coaxial relation with the elongated cylindrical portion and being secured to an end thereof opposite said one end.

12. The tool according to claim 11 wherein the slot is adapted to engage a cylindrical strike pin between two portions of the bar extending on opposite sides of the slot, where the distance between the two portions is larger than the diameter of the strike pin, but smaller than the diameter of said disc shaped stop.

* * * * *